United States Patent

[11] 3,622,697

[72] Inventor Lenard M. Metzger
Rochester, N.Y.
[21] Appl. No. 56,658
[22] Filed July 20, 1970
[45] Patented Nov. 23, 1971
[73] Assignee Eastman Kodak Company
Rochester, N.Y.
Continuation of application Ser. No. 739,288, June 24, 1968, now abandoned. This application July 20, 1970, Ser. No. 56,658

[54] SOLID-STATE SCANNING ARRAY FOR INTERLACED SIGNALS
18 Claims, 4 Drawing Figs.

[52] U.S. Cl. .......... 178/7.7, 178/7.3 D, 250/220 M
[51] Int. Cl. .......... H04n 3/14, H04g 3/68
[50] Field of Search .......... 178/7.3 D, 7.7; 250/220 M

[56] References Cited

UNITED STATES PATENTS

| | | | |
|---|---|---|---|
| 2,976,360 | 3/1961 | Riddle | 178/7.3 D |
| 3,116,436 | 12/1963 | Sweeney | 178/7.7 |
| 3,131,256 | 4/1964 | Frohbach | 178/6.6 A |
| 3,379,831 | 4/1968 | Hashimoto | 178/7.3 D |

*Primary Examiner*—Terrell W. Fears
*Assistant Examiner*—Howard W. Britton
*Attorneys*—Daniel E. Sragow and R. W. Hampton

ABSTRACT: Apparatus for producing an interlaced scan of a matrix of discrete elements. The elements are arranged in vertical columns and horizontal rows, coincidentally addressed by vertical and horizontal ring counters. The horizontal address connections are divided into two groups, for the right half and left half of the display. Each left-half line is connected to a vertically displaced right-half line and the vertical ring counter is incremented at the beginning and at the center of each line scan, which produces an interlaced scan. During retrace intervals the ring counters step without connecting scanning elements, and additional logic circuitry produces standard blanking and synchronizing pulse signals.

LENARD M. METZGER
INVENTOR.

BY Daniel E. Sragow
Robert W Hampton

ATTORNEYS

LENARD M. METZGER
INVENTOR.

BY Daniel E. Sragow
Robert W Hampton

ATTORNEYS

LENARD M. METZGER
INVENTOR.
BY David E. Sragow
Robert W. Hampton
ATTORNEYS

LENARD M. METZGER
INVENTOR.

BY Daniel E. Sragow
Robert W. Hampton
ATTORNEYS

SOLID-STATE SCANNING ARRAY FOR INTERLACED SIGNALS

REFERENCE TO COPENDING APPLICATION

This application is a continuation of copending application Ser. No. 739,288 filed June 24, 1968 and now abandoned.

BACKGROUND OF THE INVENTION

In the prior art, a scanning operation such as is used in television reproduction has been produced using a cathode-ray tube. Deflection in a cathode-ray tube has been accomplished either magnetically or electrostatically in order to produce the scan. In order to produce an interlaced scan, the tube is scanned first and then scanned again, the second scan being displaced vertically by half a line so that the second scan interlaces with the first scan. Cathode-ray tube scanners have been satisfactory for some purposes, but they sometimes have not had the desired temporal or spatial linearity for some instrumentation purposes. It is desirable to provide an interlaced scan using discrete elements so as to improve the spatial linearity. However, existing technology has not been able to produce an interlaced scan from a scanning array which consisted entirely of solid-state elements.

SUMMARY OF THE INVENTION

It is therefore an object of the invention to provide a scanning array which is composed of discrete elements which are activated by external switching means.

It is further object of the invention to provide a scanning array which is linear enough for the most exacting instrumentation purposes.

These and other objects of the invention are accomplished by providing a matrix of discrete elements, each of which is activated in turn by a pair of ring counters, and in which various points on the ring counters are interconnected in order to produce an interlaced scan. Connections are also made to various points in the ring counters in order to obtain a sync waveform for television transmission.

BRIEF DESCRIPTION OF THE DRAWING

Other objects and advantages of the invention will appear from the description when taken with the accompanying drawing wherein.

DESCRIPTION OF THE PREFERRED EMBODIMENT

Figure 1:
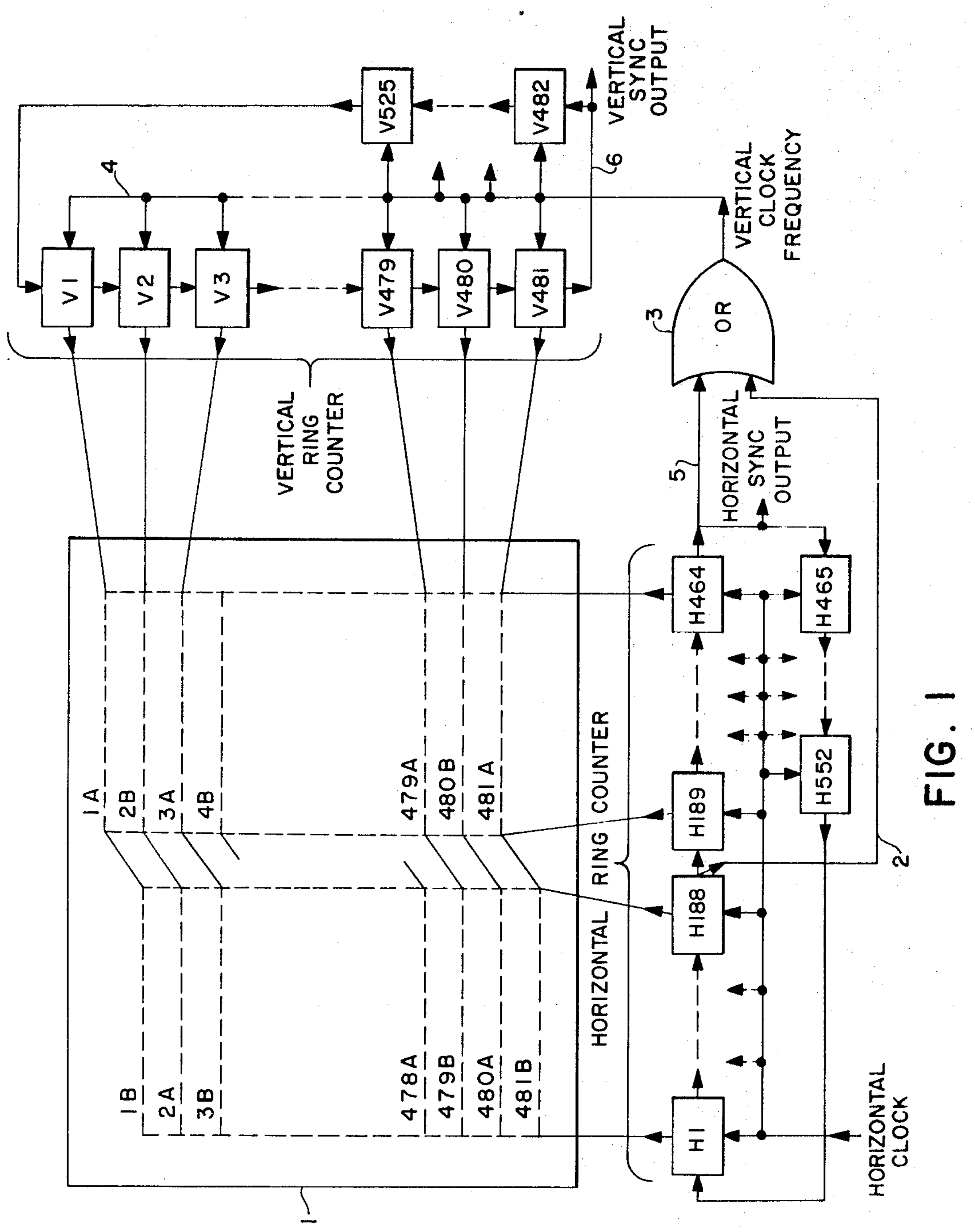
FIG. 1 shows a block diagram of a scanning array which produces a true interlaced scan.

Referring to FIG. 1, there is shown a two-dimensional array 1 of elements which could be photo conductors if the array were to be used for television pickup. The array consists of 481 lines, each line containing 464 elements. Each of the elements has one of its leads brought out to the right edge of the array whereas the other of its leads is brought out to the lower edge of the array. The various lines of elements are identified as 1*a*, 1*b*, 2*a*, 2*b*, etc., down to 481*b*.

A standard interlaced scan starts at the upper left corner and traces out 481 lines, the last line ending at the bottom center of the display. The scan then retraces to the top center of the display and starts another scan from the top center to the right then retracing to the left, etc. This is the type of scan that is herein produced using discrete elements.

The leads from the elements that are brought out of the right side of the array are connected to the various elements of a vertical ring counter consisting of counting stages V1, V2, through V481. In order to provide time for retrace, the vertical ring counter continues through stage V525 before it resets.

The other leads of the elements are brought out to a horizontal ring counter consisting of stages H1 through H464. Again, in order to provide time for horizontal retrace the horizontal ring counter goes on through stages H552 before it resets.

The embodiment of FIG. 1 operates as follows:

The system starts with horizontal ring counter energized at stage H1 and with vertical ring counter energized at stage V1. The scan therefore starts on line 1B at its left. As the horizontal ring counter is stepped along by the horizontal clock, the scan proceeds to the middle of the array, at which time ring counter stage H188 is energized. At this time a pulse is coupled along line 2 to OR-gate 3 which in turn couples the pulse along line 4 to the vertical ring counter. The vertical ring counter therefore advances to stage V2 thus energizing lines 2*a* and 2*b*. Since stage 189 of the horizontal ring counter is now energized, the scan continues along line 2*b* till it gets to the end of the line at which time horizontal ring counter stage 464 is energized. This causes a pulse to be produced on line 5 which is again coupled through OR-gate 3 to the vertical ring counter. Vertical ring counter stage V3 is then energized. However, none of the elements are energized since the horizontal ring counter must step from stages H465 through H552 before horizontal ring counter stage H1 is energized. This delay caused by stepping from horizontal ring counter stage H465 to H552 provides time for horizontal retrace. When horizontal ring counter stage H1 is finally energized, the trace again commences on line 3*b*.

The trace continues in this fashion down to line 481*b*. When line 481*b* has completed its scan, a pulse is produced on line 2 which is fed through OR-gate 3 to the vertical ring counter. The vertical ring counter is then advanced to stage V482. It should be noted that none of the elements of the array are energized until the horizontal ring counter has made enough cycles so that the vertical ring counter proceeds to V525. The time that it takes for the vertical ring counter to step from V482 to V525 corresponds to the vertical retrace time. The next vertical pulse causes vertical ring counter stage V1 to be energized. Since there are an even number of stages in the vertical counter from stage V482 to stage V525, stage H189 of the horizontal ring counter is energized when vertical ring counter stage V1 becomes energized for the second scan. The scan therefore starts on line l*a* for the second half of the interlaced scan. It continues down to the end of line 481*a* where it retraces back to the beginning of line l*b*.

It is, of course, apparent that 525 vertical ring counters stages have been selected to correspond to the standard television scan which consists of 525 lines. The horizontal ring counter may have as many stages as is necessary to produce the desired resolution. If desired, vertical and horizontal sync output pulses may be taken from lines 6 and 5 respectively.

It can therefore be seen that the arrangement shown in FIG. 1 produces a true linear interlaced scan. It should be noted, however, that the array shown in FIG. 1 uses 480×464 or 222,720 sensors. If it is desired to use half as many sensors and the designer is willing to sacrifice the vertical resolution of a true interlaced scan, the same horizontal resolution can be maintained while using half as many sensors using the array shown in FIG. 2.

Figure 2:
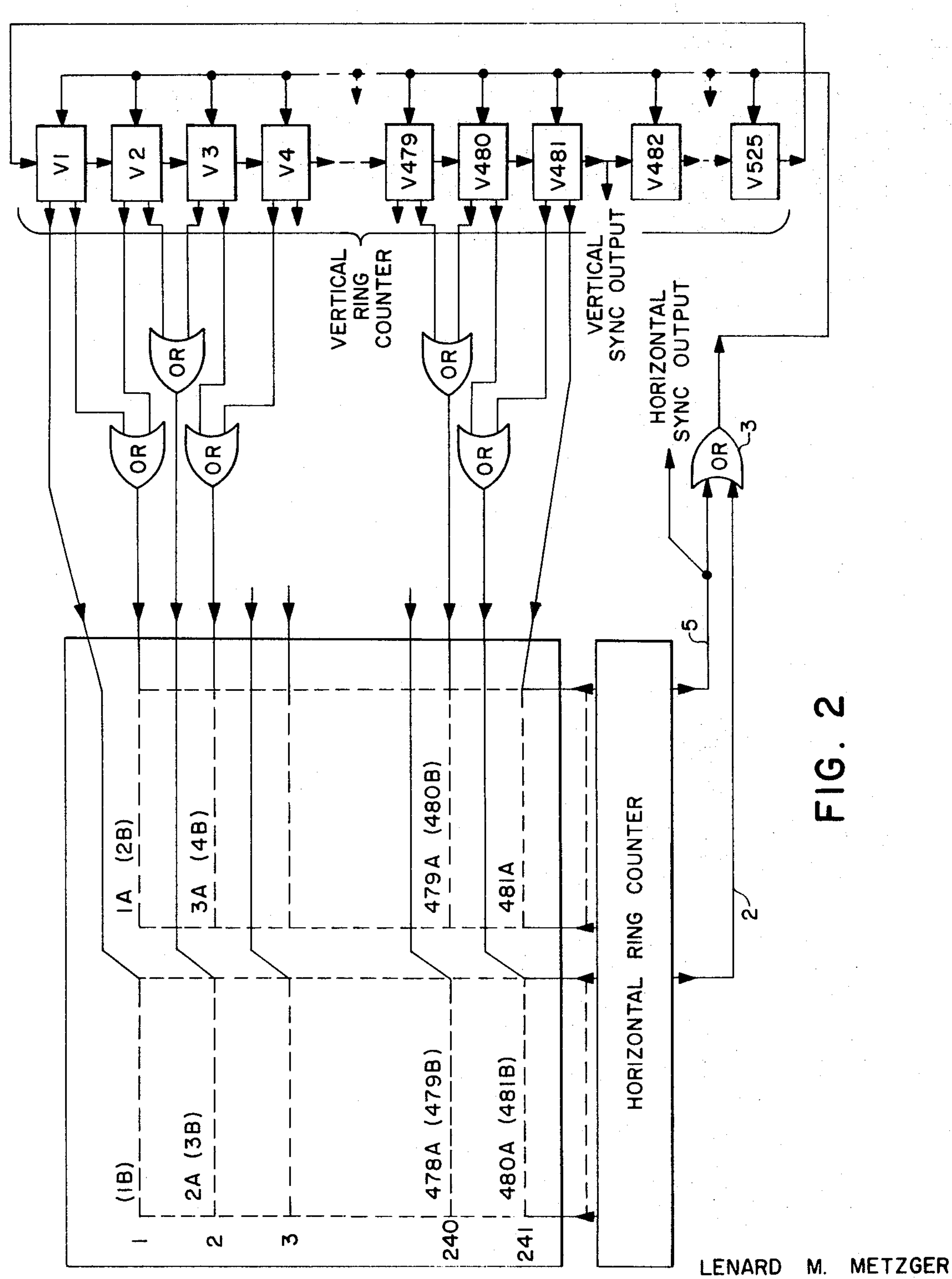
FIG. 2 shows a block diagram of a scanning array which approximates an interlaced scan and requires half as many elements as the array of FIG. 1.

FIG. 2 shows the same horizontal ring counter and vertical ring counter as in FIG. 1. Again, each horizontal row contains 464 sensors. However, instead of having 480 rows, there are only 240 rows. Since there are half as many rows, each stage of the vertical ring counter must energize two rows at a time. This is done through addition OR gates.

The device shown in FIG. 2 operates as follows:

As in FIG. 1 both the horizontal and vertical ring counters start at their first stage. The scan therefore starts at the left of line l*b* and continues until horizontal ring counter stage H188 is reached. At this time a pulse is coupled on line 2 through OR-gate 3 to the vertical ring counter which advances it to stage V2. When vertical ring counter stage V2 is energized, line 1*a* is energized so that the scan continues along line 1*a* until horizontal ring counter stage H464 is energized. The vertical ring counter is then advanced again so that vertical ring counter stage V3 is energized to start the scan on line 2*a*. The scan proceeds down to the end of line 480*a* and retraces as in FIG. 1. However, the scan now starts on line 1*a* and continues on lines 2*a*, 3*a*, etc. It can therefore be seen that although the electronics are producing an interlaced scan, what is actually being produced is two scans which are actually on top of each other instead of being interlaced. This is the price of dispensing with half of the sensors so that only 111,860 sensors are used.

Figure 4:
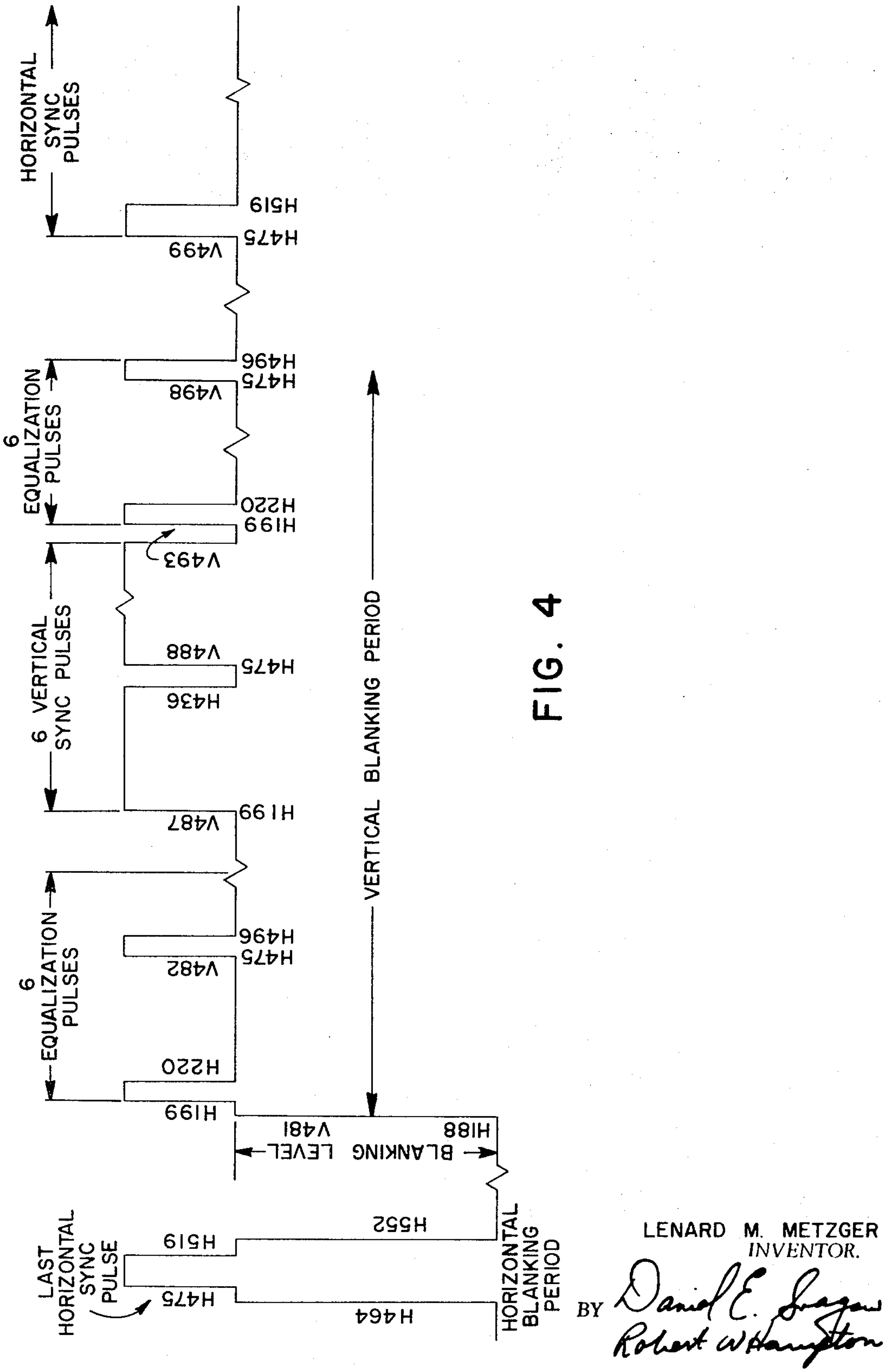
FIG. 4 shows the trace of a typical sync waveform.

If the scanning array is to be used as a television pickup, it is desirable to also obtain the proper sync waveform. An EIA sync waveform is shown in FIG. 4 as it would relate to an array shown in FIG. 1. After a horizontal sweep, the scan executes a retrace, during which time it is blanked. Therefore, the horizontal blanking pulse is begun by horizontal ring counters stage H464. This turns off the scan during the horizontal retrace. On top of the horizontal blanking pulse is placed a horizontal sync pulse. This occurs during the interval of horizontal ring counters stages H475 to H519. When the horizontal ring counter reaches stage H552, the horizontal blanking period ends and the scan is again turned on so that another sweep can begin. When a complete trace has finished and horizontal ring stage H189 and vertical ring counter stage V482 are on simultaneously, the scan is blanked for the vertical blanking period. On top of the vertical blanking pulse there are six equalization pulses, six vertical sync pulses, another six equalization pulses, and a horizontal sync pulse. FIG. 4 shows the various stages of the ring counters where these pulses are derived.

Figure 3:
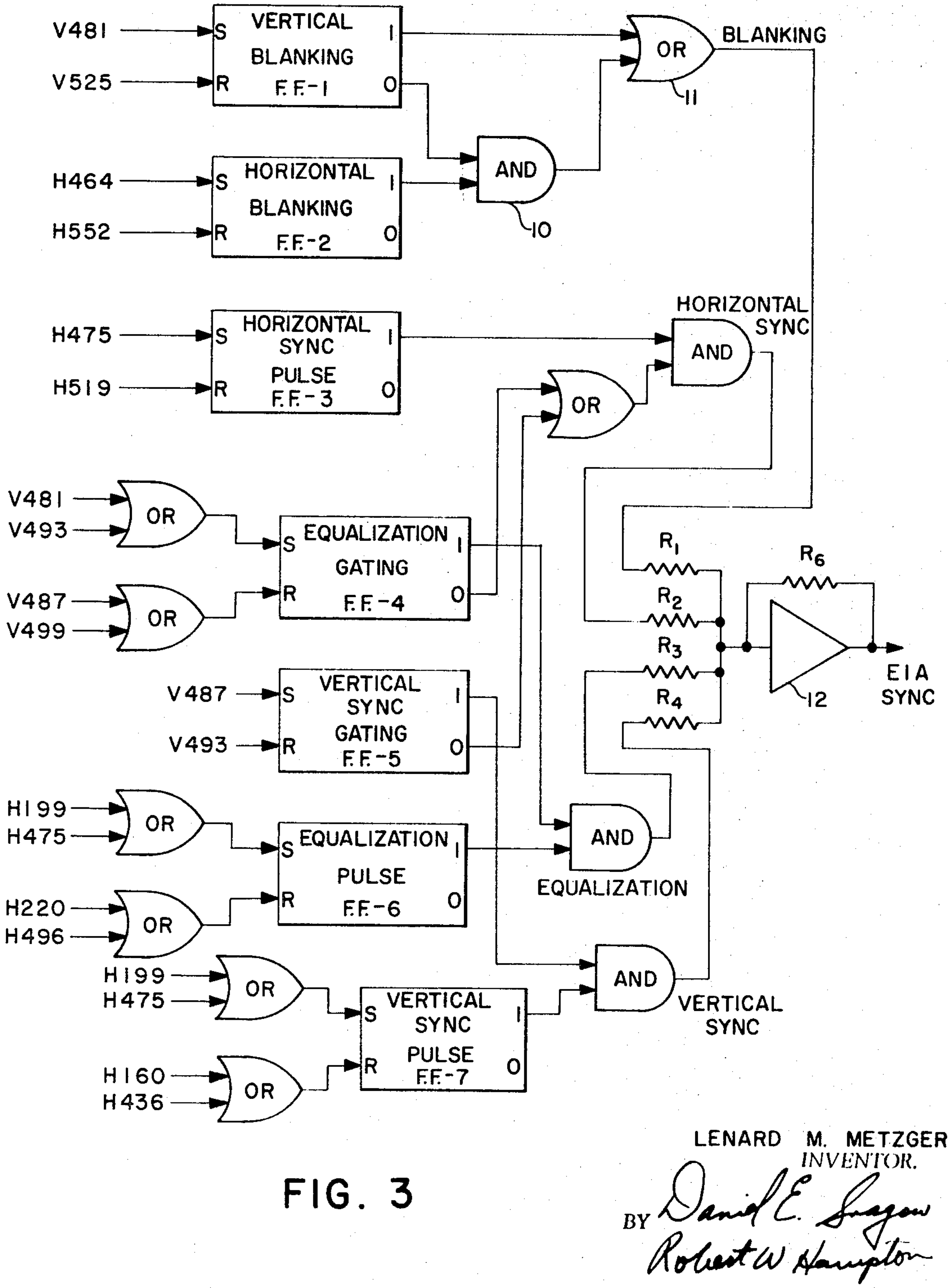
FIG. 3 shows a block diagram of the circuitry used to obtain a sync waveform.

Referring to FIG. 3, there is shown a block diagram of the circuitry used to produce the complete EIA sync waveform, which is shown in FIG. 4. The outputs of vertical ring counters stages V481 and V525 are fed to the S&R inputs, respectively, of vertical blanking flip-flop 1, respectively. Similarly, horizontal ring counters stages H464, H552, H475, and H519 are fed to horizontal blanking flip-flop 2 and horizontal sync pulse flip-flop 3, respectively. It can be seen from FIG. 1 that vertical blanking begins immediately after vertical ring counter stage V481 is energized and ends immediately before vertical ring counter stage V1 is energized. Conversely, horizontal blanking occurs after horizontal ring counter stage H464 has been activated and ends immediately before horizontal ring counter stage H1 has been activated. The outputs of the vertical blanking flip-flop and the horizontal blanking flip-flop are fed to AND-gate 10 and then to OR-gate 11 to produce the blanking waveform. The horizontal sync waveform and the equalization and vertical sync waveforms are similarly generated. The individual waveforms are summed in operational amplifier 12. The relative heights of the various individual waveforms is determined by the ratio of resistors $R_1$, $R_2$, $R_3$, $R_4$, to resistor $R_6$. For more information on synchronization waveforms, reference is hereby made to "-Television Engineering Handbook" by Donald G. Fink, New York: McGraw-Hill Book Company, Inc., 1957.

It is, of course, apparent that the embodiments of the scanning array which have been described, could be used either as a television pickup or as a television display. Instead of using photosensitive elements in the array in order to provide a pickup, the array could consist of individual illuminable elements in order to be used as a display. Of course, when using the array as a display, it would not be necessary to derive the synchronization waveforms.

Although the invention has been described in considerable detail with reference to preferred embodiments thereof, it will be understood that variations and modifications can be effected without departing from the spirit and scope of the invention as described hereinabove and as defined in the appended claims.

I claim:

1. In apparatus for scanning an array of elements, the combination comprising:

a. a plurality of elements arranged in an array of M rows and N columns, each element having a first and a second terminal;
b. N column conductors connected to said first terminals of each element in each respective column;
c. M row conductors connected to said second terminals of each element in each respective row;
d. first signal means for providing a first signal;
e. first switching means for successively applying said first signal to each of said N column conductors in a repeating sequence;
f. second signal means responsive to the application of said first signal to at least two of said N column conductors for providing a second signal;
g. a common terminal; and
h. second switching means responsive to said second signal for successively connecting said common terminal to another of said M row conductors.

2. The apparatus of claim 1 wherein said two N column conductors comprise the Nth column conductor and the N–X column conductor, wherein X is a predetermined number between 1 and N.

3. In apparatus for scanning an array of elements, the combination comprising:

a. a plurality of elements arranged in first and second portions of an array of M rows and N columns, each element having a first and second terminal;
b. N column conductors connected to said first terminals of each element in each respective column;
c. first signal means for providing a first signal;
d. first switching means for successively applying said first signal to each of said N column conductors in a repeating sequence;
e. second signal means responsive to the application of said first signal to a predetermined one of said column conductors in said first and said second portions of the array for providing a second signal;
f. a common terminal; and
g. second switching means responsive to said second signal for successively connecting said common terminal to the second terminals of said elements of a respective row of elements in either said first or said second portion of the array.

4. The apparatus of claim 3 wherein a. said second signal means is responsive to the application of said first signal to a predetermined one of said column conductors in said first portion of said array and to a predetermined one of said column conductors in said second portion of said array for providing in each instance a second signal; and
b. said second switching means is responsive to each occurrence of said second signal for successively connecting said common terminal to the second terminals of said elements of a respective row of elements in either said first or second portion of the array in a repeating sequence.

5. In apparatus for scanning an array of elements, the combination comprising:

a. a plurality of elements arranged in first and second portions of an array of M rows and N columns, each of said elements having a first and a second terminal;
b. N column conductors connected to the first terminals of each element in each respective column;
c. first signal means for providing a first signal;
d. first switching means for successively applying said first signal to each of said N column conductors in a repeating sequence;
e. second signal means responsive to the application of said first signal to a predetermined one of said column conductors in said first portion of the array for providing a second signal;
f. third signal means responsive to the application of said first signal to a predetermined one of said column conductors in said second portion of the array for providing in each instance a third signal;

g. a common terminal;

h. second switching means responsive to said second signal for successively connecting said common terminal to said second terminals of said elements of a respective row of elements in said second portion of the array and responsive to each occurrence of said third signal for successively connecting said common terminal to said second terminals of said elements of respective row of elements in said first portion of said array.

6. The apparatus of claim 5 wherein said M rows of elements in said second portion of said array are each physically displaced from the M rows of elements in said first portion of the array.

7. The apparatus of claim 5 wherein said M rows of elements of said second portion of said array are physically displaced by one row from said M rows of elements of said first portion of the array.

8. In apparatus for scanning an array of elements, the combination comprising:

a. a plurality of elements arranged in first and second portions of an array of M rows and N columns, each of said plurality of elements having a first and a second terminal, said M rows of elements of said second portion of said array being physically displaced by one row from the corresponding M rows of elements of said first portion of said array;

b. N column conductors connected to said first terminals of each element in each respective column;

c. M row conductors connected to said second terminals of each element in each respective corresponding row in said first and in said second portion of the array;

d. first signal means for providing a first signal;

e. first switching means for successively applying said first signal to each of said N column conductors in a repeating sequence;

f. second signal means responsive to the application of said first signal to a predetermined one of said column conductors of said first portion of the array and to a predetermined one of said column conductors of said second portion of the array for providing a second signal;

g. a common terminal; and h. second switching means responsive to said second signal for successively connecting said common terminal to each of said M row conductors in a repeating sequence.

9. The apparatus of claim 8 wherein said predetermined one of said column conductors in said second portion of the array is said N column conductor and said predetermined one of said column conductors in said first portion of the array is the N–X column conductor, wherein X is the total number of column conductors in said second portion of the array.

10. The apparatus of claim 8 wherein said first switching means comprises:

a. a source of clock signals recurring at a predetermined frequency; and b. a horizontal ring counter having N stages connected to said N column conductors and responsive to said clock signals for applying said first signal in sequence to each of said N column conductors at said predetermined frequency.

11. The apparatus of claim 10 wherein said second signal means is responsive to the advancement of said horizontal ring counter to the N column conductor in said second portion of the array and the N–X column conductor in said first portion of the array for providing, in each instance, said second signal, and said second switching means comprises a vertical ring counter having M stages connected to said M row conductors and responsive to said second signal for successively connecting said common terminal to each of said M row conductors.

12. The apparatus of claim 11 wherein said horizontal ring counter includes time delay stages connected between the counter stages which are connected to the Nth column conductor and the first column conductor and means for deriving a horizontal synchronizing signal representative of said time delay.

13. The apparatus of claim 12 wherein said vertical ring counter includes time delay stages connected between the counter stages which are connected to the Mth row conductor and the first row conductor, and means for deriving a vertical synchronizing signal representative of said time delay.

14. An apparatus for scanning an array of elements, the combination comprising:

a. a plurality of elements arranged in first and second portions of an array of M rows and N columns, each of said plurality of elements having a first and a second terminal;

b. N column conductors connected to said first terminals of each element in each respective column;

c. first M row conductors connected to said second terminals of each element in each respective row in said first portion of the array;

d. second M row conductors connected to said second terminals of each element in each respective row in said second portion of the array;

e. first signal means for providing a first signal;

f. first switching means for successively applying said first signal to each of said N column conductors in a repeating sequence;

g. second signal means responsive to the application of said first signal to a predetermined one of said column conductors in said first portion of the array and a predetermined one of said column conductors in said second portion of said array for providing in each instance a second signal and a third signal, respectively;

h. a common terminal; and i. second switching means responsive to each occurrence of said second signal for successively connecting said common terminal to said second M row conductors of said second portion of the array and responsive to each occurrence of said third signal for successively connecting said common terminal to said first M row conductors of said first portion of the array in a repeating sequence.

15. The apparatus of claim 14 wherein said first switching means comprises:

a. a source of clock signals recurring at a predetermined frequency; and b. a horizontal ring counter having N stages connected to said N column conductors and responsive to said clock signals for applying said first signal in sequence to each of said N column conductors at said predetermined frequency.

16. The apparatus of claim 15 wherein said second signal means is responsive to the advancement of said horizontal ring counter to the N column conductor in said second portion of the array and the N–X column conductor in said first portion of the array for providing, in each instance, a second signal, and said second switching means comprises a vertical ring counter having M stages, each stage connected to one of said first and one of said second M row conductors.

17. The apparatus of claim 16 wherein said horizontal ring counter includes time delay stages connected between the counter stages which are connected to the Nth column conductor and the first column conductor and means for deriving a horizontal synchronizing signal representative of said time delay.

18. The apparatus of claim 17 wherein said vertical ring counter includes time delay stages connected between the counter stages which are connected to the Mth row conductor and the first row conductors and means for deriving a vertical synchronizing signal representative of said time delay.

* * * * *